Feb. 11, 1964

A. VILLASANA 3,120,680

MOLD SELECTOR VALVE

Filed Jan. 3, 1961

INVENTOR.
ARMANDO VILLASANA

BY Hudson and Young

ATTORNEYS

INVENTOR.
ARMANDO VILLASANA

INVENTOR.
ARMANDO VILLASANA

United States Patent Office 3,120,680
Patented Feb. 11, 1964

3,120,680
MOLD SELECTOR VALVE
Armando Villasana, Bartlesville, Okla., assignor to Phillips Petroleum Company, a corporation of Delaware
Filed Jan. 3, 1961, Ser. No. 80,358
16 Claims. (Cl. 18—30)

This invention relates to a mold selector valve. In one aspect this invention relates to a mold selector valve which will permit employing one or more mold cavities in a mold provided with a plurality of mold cavities. In another aspect this invention relates to a mold cavity plate provided with a plurality of cavities, and having an improved selector valve mounted in said plate.

In the art of molding articles from plastic materials, a mold having a plurality of mold cavities supplied with moldable material from a single sprue passage is frequently employed. This is particularly true in the molding of small articles such as caps for bottles, etc. The size and shape of said mold cavities can, of course, vary greatly depending upon the article to be molded. In some instances, the plural mold cavities are all of the same size and the mold is adapted to mold a plurality of the same article in each cycle of the molding operation. Sometimes, however, the plural mold cavities formed by or between the mold members or dies will be of different sizes and shapes and adapted to mold different articles of different sizes and shapes. This situation can exist, for example, where a manufacturer has a line of products which differ only in size, e.g., caps for different size bottles. When the mold is provided with different size cavities it sometimes happens, depending upon inventory, sales orders, etc., that it is not desirable to manufacture all different sizes of the article which the mold is capable of molding. In such instances, it is necessary to block off one or more of the mold cavities.

Another instance where molds provided with plural cavities are used is in development work relating to either the development of a new product or a new moldable material. In such instances, it is frequently desirable to employ less than the full number of cavities provided in the mold.

In molds having a plurality of cavities which are supplied with moldable material from a single sprue passage, there are provided plural channels or runners extending from said sprue passage into communication with said cavities, one channel or runner extending from said sprue passage to each cavity. Said channels or runners are commonly in the form of grooves formed in the meeting face of one die or mold member. Thus, when less than the full number of the plural mold cavities is being employed it is necessary to block off one or more of said channels or runners. In the prior art, this has sometimes been done by installing inserts comprising half-round segments which are machined to fit into said channels. Said inserts must, of course, be machined to close tolerances in order to fit properly into said channels. To install said inserts it is usually necessary to remove the entire mold or at least one of the dies or mold members from the press. Installing said inserts is a tedious, time-consuming operation. Frequently, leaks of material around or under the inserts in the channel will develop even through said inserts are closely machined. In such instances a positive shut off is not provided. Thus, while said inserts can usually be made to operate, they are not a satisfactory solution to the problem.

The present invention provides a solution to the above difficulties. According to the invention, there is provided a selector valve which will provide a positive and complete shut off of one or more of the channels leading to the plural mold cavities and thus will permit the use of one or all of the plural cavities in a mold provided with a plurality of cavities. Broadly speaking, said selector valve comprises a ring having a plane face and a plurality of channels extending radially across said face at predetermined spaced intervals.

An object of this invention is to provide an improved mold selector valve. Another object of this invention is to provide a selector valve for a mold which will permit employing one or all of a plurality of mold cavities in a mold provided with a plurality of cavities. Another object of this invention is to provide a mold cavity plate having a plurality of cavities formed therein and having a selector valve mounted therein which will permit employing one or all of said cavities in molding operations. Another object of this invention is to provide a selector valve which can be readily employed to block one or more gate channels or runners leading to one or more of a plurality of cavities not desired in the product molding, without removing the mold or die from the press. Other aspects, objects, and advantages will be apparent to those skilled in the art in view of this disclosure.

Thus according to one embodiment of the invention, there is provided a cavity plate comprising: a body having a plane meeting face; a sprue passage extending through said body to said face; a plurality of cavities, open to said face, formed in said body about said sprue passage; an annular recess in said face, surrounding said sprue passage and between same and said cavities; a plurality of channel means, each extending radially from said sprue passage across said face to the inner edge of said recess and continuing radially across said face from the outer edge of said recess into communication with said cavities, each one of said cavities being in communication with the outer edge of said recess through only one of said channel means; a valve ring rotatably mounted in said recess; and a plurality of valve channels extending radially, with respect to said sprue passage, across said ring at predetermined spaced intervals such that said ring can be adjustably rotated to place from one to all of said valve channels in communication with from one to all of said channel means, respectively, and thus place said sprue passage in communication with from one to all of said cavities.

Figure 1:
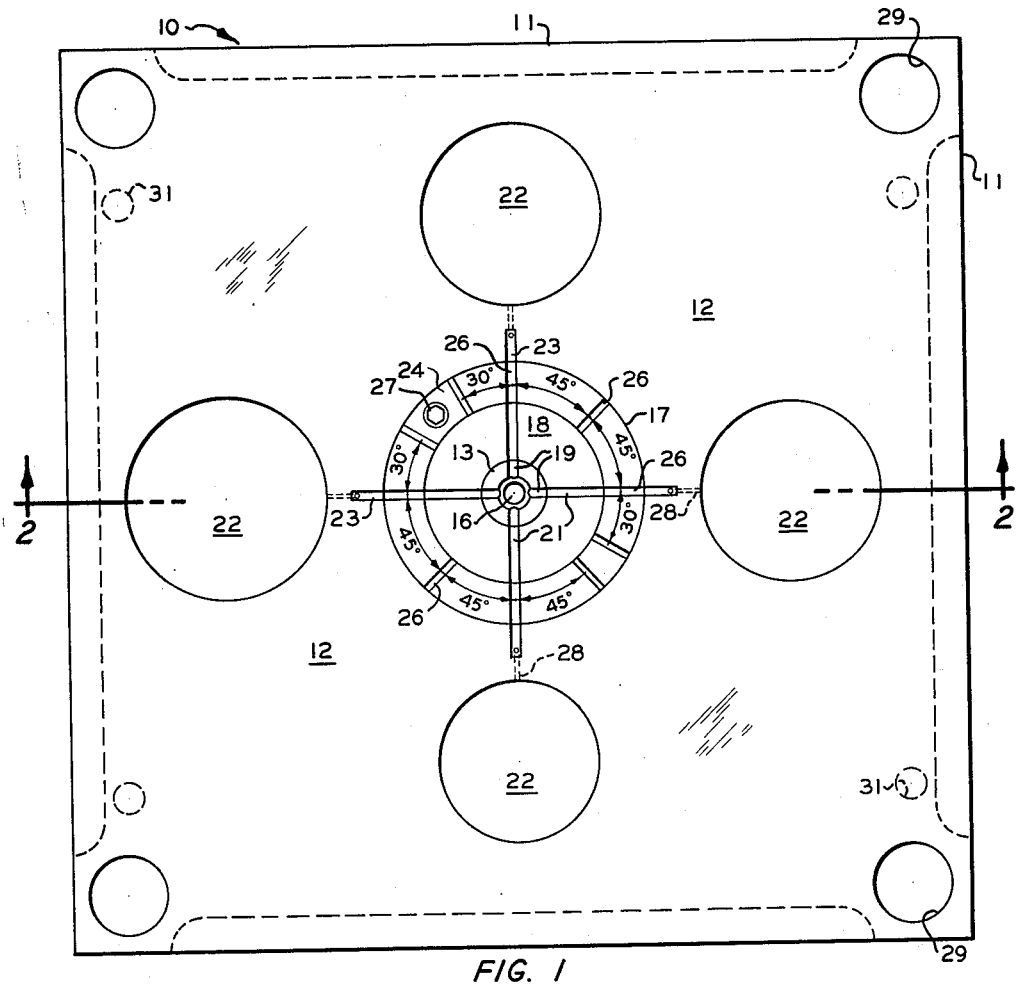
FIGURE 1 is a diagrammatic plan view of a mold cavity plate provided with four cavities and having a selector valve of the invention mounted therein.
Figure 3:
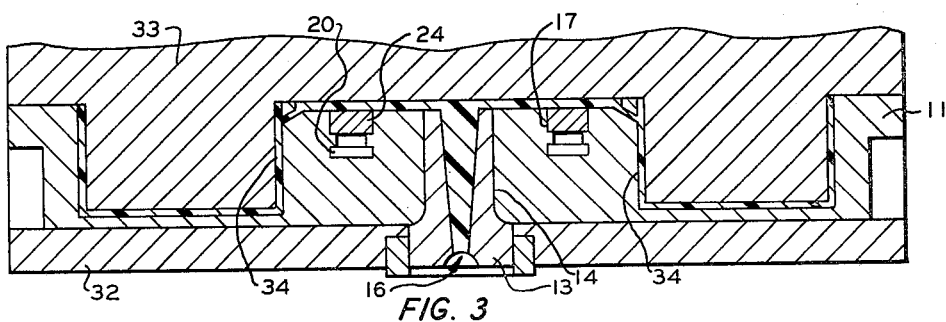

FIGURE 3 also shows a cross section along the lines 2—2 of the cavity plate of FIGURE 1 and, in addition, shows the relationship of a core plate employed with said cavity plate to form the completed mold.

Figure 4:
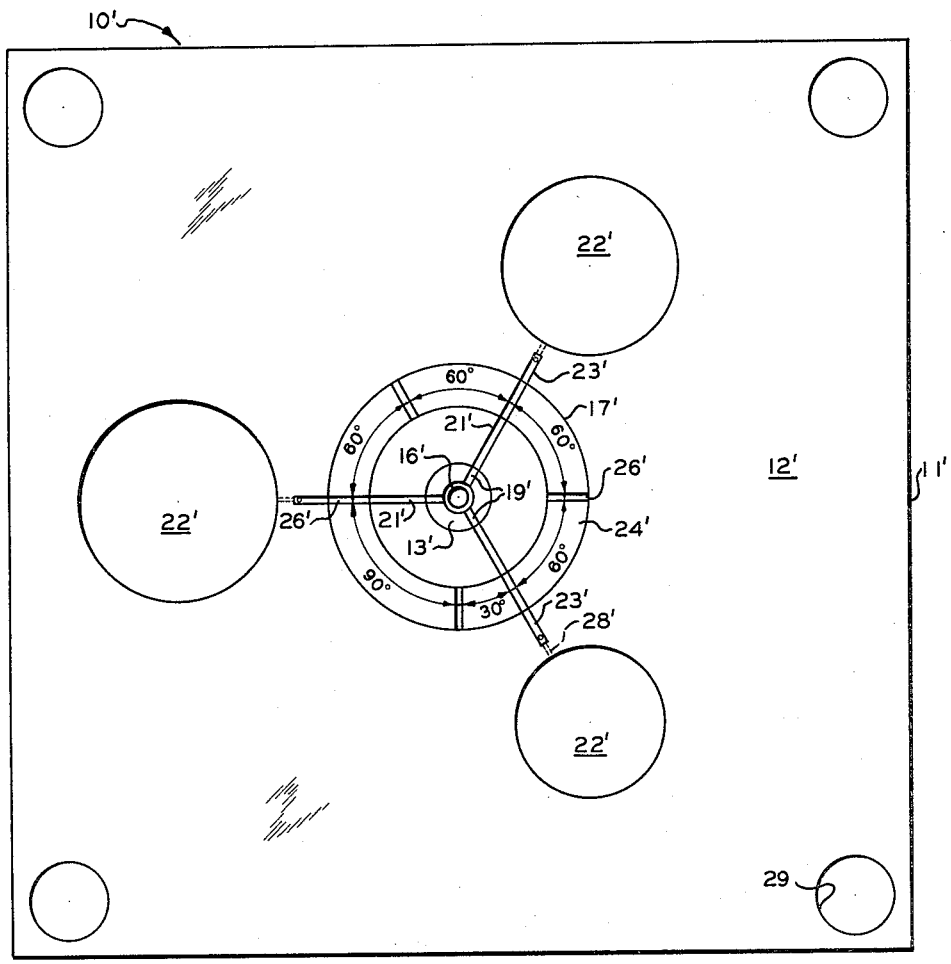

FIGURE 4 is a diagrammatic plan view of a cavity plate provided with three cavities and having a selector valve in accordance with the invention installed therein.

Figure 5:
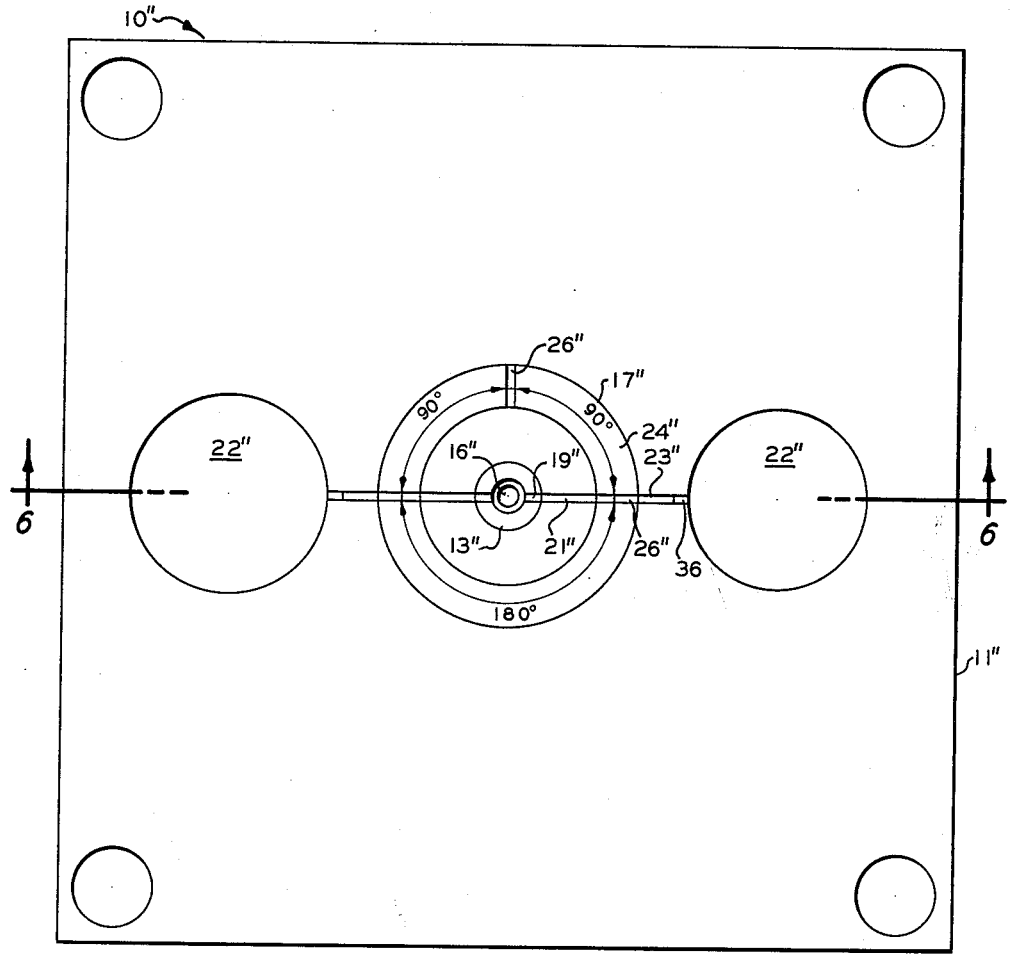

FIGURE 5 is a diagrammatic plan view of a cavity plate provided with two cavities and having a selector valve of the invention installed therein.

Figure 6:
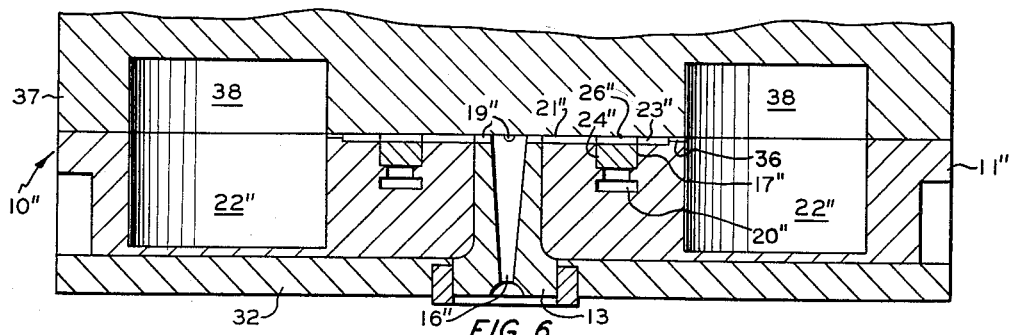

FIGURE 6 is a diagrammatic view showing a cross section along the lines 6—6 of FIGURE 5 and also illustrating the use of another cavity plate with said first cavity plate.

Figure 2:
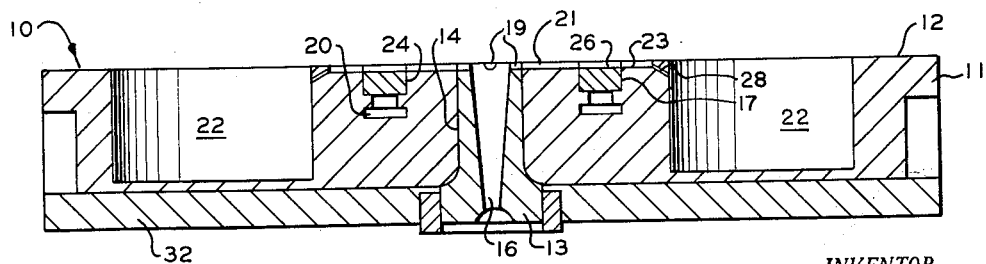
FIGURE 2 is a cross section along the lines 2—2 of FIGURE 1, and shows in addition the relationship between said cavity plate and the clamping plate to which said cavity plate is attached in the press.

Referring now to said drawings wherein like reference numerals are employed to denote like elements the invention will be more fully explained. In FIGURES 1 and 2 there is illustrated a cavity plate, designated generally by the reference numeral 10, comprising a body 11 having a plane meeting face 12. A sprue bushing 13 is disposed in an opening 14 which extends through said body 11. A sprue passage 16 extends from an exposed portion of the mold through said bushing 13 to said face 12. An annular recess 17 is provided in said plane face 12, surrounds said sprue bushing 13, and forms an annular land 18 between said bushing and said recess. A plurality of first channels 19 are in communication with and extend radially from said sprue passage across the face of said sprue bushing. A plurality of second channels 21, each one in communication at one end thereof with only one of said first channels, extends radially with respect to said sprue passage across said annular land 18 to the inner edge of said recess 17. A plurality of cavities 22 are formed in said body 11 about and adjacent the outer edge of said recess 17 and are open to said plane face 12. A plurality of third channels 23 are formed in said plane face 12 and extend radially with respect to said sprue passage from the outer edge of said recess 17 into communication with said cavities, each one of said cavities being connected to said recess through only one of said third channels. Said first channels 19, said second channels 21, and said third channels 23 thus comprise a plurality of channel means which each extend radially from said sprue passage 16 across the face of said sprue bushing, across said land 18, to the inner edge of said recess 17, and continue radially across said face 12 from the outer edge of said recess into communication with said cavities, each one of said cavities being in communication with the outer edge of said recess and thus in communication with said sprue passage through only one of said channel means.

A valve ring 24 is rotatably mounted in said recess 17. Said valve ring is provided with a plurality of valve channels 26 which extend radially, with respect to said sprue passage 16, across said valve ring at predetermined spaced intervals such that said valve ring can be adjustably rotated to place from one to all of said valve channels in communication with from one to all of said third channels 23, respectively, and also in communication with from one to all of said second channels 21, respectively, and thus place said sprue passage 16 in communication with from one to all of said cavities 22. A set screw 27 is provided to fix said valve ring 24 in position when registration is effected between the desired number of said valve channels and said second and third channels. The top of said set screw is flush with the face of ring 24 and has a wrench opening in the top thereof. The lower end of said set screw engages a nut (not shown) which is movable (until tightened) in the annular passage 20 located below annular recess 17. If desired, a plurality of set screws and nuts can be employed.

Communication from said third channels 23 to said cavities 22 is completed by means of gates 28 which comprise a small passage sloping downwardly from the bottom of the outer end of said third channels, through said body 11, and into said cavities.

Leader pins 29 extend from the surface of face 12 and engage complementary recesses in the other mold member when the mold is closed. Countersunk holes 31 are provided for bolts which are used in bolting the cavity plate 10 to the clamping plate 32 of the press.

In the cavity plate 10 of FIGURE 1 wherein four cavities 22 are provided, ten valve channels 26 are provided in order to accommodate employing one or all of said cavities 22. Thus, starting with the top valve channel 26, as a first valve channel, which would correspond to the twelve o'clock position on a clock, and proceeding clockwise there is provided a second valve channel spaced at an interval of 45° from said first channel, a third valve channel is spaced 45° from said second channel, a fourth valve channel is spaced 30° from said third valve channel, a fifth valve channel is spaced 15° from said fourth valve channel, a sixth valve channel is spaced 45° from said fifth valve channel, a seventh valve channel 45° from said sixth valve channel, an eighth valve channel is spaced 45° from said seventh valve channel, a ninth channel is spaced 30° from said eighth valve channel, and a tenth valve channel is spaced 30° from said ninth valve channel. It will be understood that said spacings are measured from the center lines of the channels.

Referring now to FIGURE 2, there is shown a cross section of cavity plate 10 taken along the lines 2—2 of FIGURE 1 and to which there has been added clamping plate 32 to which said cavity plate 10 would be attached in the press.

FIGURE 3 is similar to FIGURE 2 but there is also shown a core plate 33 which is complementary to said cavity plate 10. Said cavity plate and said core plate are shown as they would appear when the mold is closed. Thus, said core plate 33 and said cavity plate 10 meet at a mold parting plane and together form a plurality of mold cavities therebetween when the mold is closed. In FIGURE 3, said mold cavity is shown as being filled with a plastic material 34, such as polyethylene, which has been introduced through sprue passage 16 and the above-described channel means into said mold cavities.

Referring now to FIGURE 4, there is illustrated a second mold cavity designated generally by the reference numeral 10' which is essentially like that illustrated in FIGURE 1 except that only three cavities 22' are provided. The remainder of the elements in the cavity plate of FIGURE 4 are like those described above in connection with FIGURE 1 except that fewer channel means are provided. Thus, valve ring 24' is provided with only six valve channels in order to accommodate employing from one to all of the three cavities 22'. Starting with a first valve channel 26' at the three o'clock position and proceeding clockwise there is provided a second valve channel which is spaced 60° from said first valve channel, a third valve channel which is spaced 30° from said second valve channel, a fourth valve channel which is spaced 90° from said third valve channel, a fifth valve channel which is spaced 60° from said fourth valve channel, and a sixth valve channel which is spaced 60° from said fifth valve channel.

In FIGURE 5, the cavity plate designated generally 10" is provided with only two cavities 22" and a selector valve ring 24" having only three valve channels 26" is provided so as to be able to use one or both of said cavities 22". Starting with a first valve channel 26" at the twelve o'clock position on said selector valve ring and proceeding clockwise, there is provided a second valve valve channel which is spaced 90° from said first valve channel, and a third valve channel which is spaced 180° from said second valve channel. FIGURE 5 also illustrates a modification of the gate passage which provides communication between the outer end of third channel 23" and said cavities 22". Said gate passage, here designated by the numeral 36, comprises a continuation of third channel 23', said continuation having a depth less than that of said channel 23" as shown more clearly in FIGURE 6.

Set screw 27 has been omitted from rings 24' and 24" in FIGURES 4 and 5 to simplify said drawings. As will be understood by those skilled in the art, such a set screw or equivalent means would be employed.

Said FIGURE 6 is a cross section along the lines 6—6 of FIGURE 5 and illustrates the cavity plate of FIGURE 5 attached to a clamping plate 32 and also in meeting position with a second cavity plate 37. Said cavity plate 37 is provided with a plurality of cavities 38 which are complementary to said cavities 22" in said cavity plate 10" and thus form a plurality of mold cavities between said two cavity plates. Said FIGURE 6 thus illustrates that the cavity plates 10, 10', and 10", each having a selector valve installed therein according to the invention, can be employed with various types of complementary dies or mold members such as another cavity plate as well as a core plate illustrated in FIGURE 3.

It is believed the operation of the selector valve, the cavity plates, and the molds of the invention will be clear from the above description thereof. Referring to FIGURE 1, if it is desired to employ all four of the cavities 22 there shown, the selector valve 24 would be fixed in the position shown. If it is desired to employ only three of the cavities shown, valve ring 24 would be rotated 45° in a clockwise direction and only three of the valve channels 26 would be in registration with second channels 21 and third channels 23. Said valve ring 24 would then be fixed in position by means of set screw 27, the mold then closed, and molding operation carried out in conventional manner. If it is desired to employ only two of the cavities 22, then said valve ring 24 would be rotated 30° in a counterclockwise direction. If it is desired to employ only one of said cavities, then said valve ring 24 would be rotated 30° in a clockwise direction. It is believed clear the operation of the valve ring in FIGURES 4 and 5 to select the desired number of cavities can be effected in a similar manner by proper rotation of the valve rings.

It is believed the advantages of the valve ring of the invention will be apparent from the above description. A plural cavity mold provided with a given plural number of cavities can be readily changed to any other number of plural cavities lesser in number, or changed to a single cavity mold. These changes can be effected quickly and easily, thus reducing both investment costs by reducing the number of molds necessary to be kept on hand and also reducing labor costs through the ease of modification.

Another outstanding advantage provided by the selector valve of the invention is that a positive closure of the channel means not desired to be in operation is afforded. The selector valve extends across said channel means and completely blocks same much more effectively than the half-round inserts of the prior art.

While the invention has been illustrated with molds having two, three, and four cavities therein, it is believed obvious from the above description that the valve ring of the invention can be employed in molds or cavity plates provided with more than four cavities. In such molds, it would only be necessary to increase the diameter of the ring selector valve so as to be able to accommodate the possible combinations.

Also, while the invention has been described as particularly adapted for the injection molding of plastic materials, such as polyethylene, it is believed obvious the invention can be employed in suitable molds for the molding of any other hardenable molten material such as metals, metal alloys, etc.

It is to be understood that the drawings are diagrammatic in nature and many elements not necessary for explaining the invention to those skilled in the art have been omitted in order to simplify said drawings. For example, each of the cavities 22, 22', and 22" in the cavity plate 10, 10', and 10", respectively, can be provided with cooling means comprising a jacket in the body of the cavity plate and surrounding the cavity, and suitable conduits for circulating a cooling fluid to said jackets.

Thus, while certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In a mold for molding articles from a hardenable molten material, wherein a single sprue passage extends through a cavity plate from an exposed portion of said mold and communicates with a plurality of cavities in said plate through a plurality of radially extending channel means, the improvement comprising a channel selector valve comprising a ring member rotatably disposed in an annular recess between said sprue passage and said cavities, said ring member being provided with a plurality of valve channels extending radially, with respect to said sprue passage, across said ring at predetermined spaced intervals such that said ring can be adjustably rotated to place from one to all of said valve channels in communication with from one to all of said channel means, respectively, and thus place said sprue passage in communication with from one to all of said cavities.

2. A cavity plate for a mold employed for molding articles from a hardenable molten material, said cavity plate comprising, in combination: a body having a plane meeting face; a sprue passage extending through said body to said face; a plurality of cavities, open to said face, formed in said body about said sprue passage; an annular recess in said face, surrounding said sprue passage and between same and said cavities; a plurality of channel means, each extending radially from said sprue passage across said face to the inner edge of said recess and continuing radially across said face from the outer edge of said recess into communication with said cavities, each one of said cavities being in communication with the outer edge of said recess through only one of said channel means; a valve ring rotatably mounted in said recess; and a plurality of valve channels extending radially, with respect to said sprue passage, across said ring at predetermined spaced intervals such that said ring can be adjustably rotated to place from one to all of said valve channels in communication with from one to all of said channel means, respectively, and thus place said sprue passage in communication with from one to all of said cavities.

3. A cavity plate for a mold employed for molding articles from a hardenable molten material, said cavity plate comprising, in combination: a body having a plane meeting face; a sprue passage extending through said body to said face; a plurality of cavities, open to said face, formed in said body about said sprue passage; an annular recess in said face surrounding said sprue passage and between same and said cavities; a plurality of first channels, each extending radially from said sprue passage across said face to the inner edge of said recess; a plurality of second channels, each extending across said face from the outer edge of said recess into communication with said cavities, each one of said cavities being in communication with the outer edge of said recess through only one of said second channels; a valve ring rotatably mounted in said recess; and a plurality of valve channels extending radially, with respect to said sprue passage, across said ring at predetermined spaced intervals such that said ring can be adjustably rotated to place from one to all of said valve channels in communication with from one to all of said first channels, respectively, and also in communication with from one to all of said second channels, respectively, and thus place said sprue passage in communication with from one to all of said cavities.

4. A cavity plate for a mold employed for molding articles from a hardenable molten material, said cavity plate comprising, in combination: a body having a plane meeting face; an opening extending through said body; a sprue bushing disposed in said opening; a sprue passage extending through said sprue bushing to said face; an annular recess in said plane face, surrounding said sprue bushing, and forming an annular land between said bushing and said recess; a plurality of first channels in communication with and extending radially from said sprue passage across the face of said sprue bushing; a plurality of second channels, each one in communication at one end thereof with only one of said first channels, and extending radially, with respect to said sprue passage, across said annular land to the inner edge of said recess; a plurality of cavities formed in said body about the outer edge of said recess and opening to said plane face; a plurality of third channels formed in said plane face and extending radially, with respect to said sprue passage, from the outer edge of said recess into communication with said cavities, each one of said cavities being connected to said recess through only one of said third channels; a valve ring rotatably mounted in said recess; and a plurality of valve channels extending radially, with respect to said sprue passage, across said valve ring at predetermined spaced intervals such that said valve ring can be adjustably rotated to place from one to all of said valve channels in communication with from one to all of said third channels, respectively, and also in communication with from one to all of said second channels, respectively, and thus place said sprue passage in communication with from one to all of said cavities.

5. A cavity plate according to claim 2 wherein: said cavities are four in number; said channel means are four in number; and said valve channels are ten in number and are spaced clockwise around said ring at the following intervals: a second valve channel 45 degrees from a first valve channel; a third valve channel 45 degrees from said second valve channel; a fourth valve channel 30 degrees from said third valve channel; a fifth valve channel 15 degrees from said fourth valve channel; a sixth valve channel 45 degrees from said fifth valve channel; a seventh valve channel 45 degrees from said sixth valve channel; an eighth valve channel 45 degrees from said seventh valve channel; a ninth valve channel 30 degrees from said eighth valve channel; and a tenth valve channel 30 degrees from said ninth valve channel.

6. A cavity plate according to claim 2 wherein: said cavities are three in number; said channel means are three in number; and said valve channels are six in number and are spaced clockwise around said ring at the following intervals: a second valve channel 60 degrees from a first valve channel; a third valve channel 60 degrees from said second valve channel; a fourth valve channel 30 degrees from said third valve channel; a fifth valve channel 90 degrees from said fourth valve channel; and a sixth valve channel 60 degrees from said fifth valve channel.

7. A cavity plate according to claim 2 wherein: said cavities are two in number; said channel means are two in number; and said valve channels are three in number and are spaced clockwise around said ring at the following intervals: a second valve channel 90 degrees from a first valve channel; and a third valve channel 180 degrees from said second valve channel.

8. A cavity plate according to claim 2 wherein means are provided for fixing said valve ring in position when registration is effected between the desired number of said valve channels and said channel means.

9. A cavity plate according to claim 3 wherein each one of said second channels communicates at its outer end with one of said cavities through a gate comprising a passage which slopes downward from the bottom of said outer end, through said body, and into said cavity.

10. A cavity plate according to claim 3 wherein each one of said second channels communicates at its outer end with one of said cavities through a gate comprising a continuation of the channel, said continuation having a depth less than that of the channel.

11. A mold for forming articles from a hardenable molten material by injection molding and comprising a pair of separable mold members having complementary faces meeting at a mold parting plane, one of said mold members being a cavity plate comprising: a body having a plane meeting face; a sprue passage extending through said body to said face; a plurality of cavities, open to said face, formed in said body about said sprue passage; an annular recess in said face, surrounding said sprue passage and between same and said cavities; a plurality of channel means, each extending radially from said sprue passage across said face to the inner edge of said recess and continuing radially across said face from the outer edge of said recess into communication with said cavities, each one of said cavities being in communication with the outer edge of said recess through only one of said channel means; a valve ring rotatably mounted in said recess; and a plurality of valve channels extending radially, with respect to said sprue passage, across said ring at predetermined spaced intervals such that said ring can be adjustably rotated to place from one to all of said valve channels in communication with from one to all of said channel means, respectively, and thus place said sprue passage in communication with from one to all of said cavities; and the other of said mold members being adapted to cooperate with said cavity plate to form a plurality of mold cavities therebetween when the mold is closed.

12. A mold structure according to claim 11 wherein said other mold member comprises a core plate having a plurality of cores extending from its meeting face, said cores being the same in number as said cavities in said cavity plate, and adapted to fit into said cavities to form said mold cavities.

13. A mold structure according to claim 11 wherein means are provided for fixing said valve ring in position when registration is effected between the desired number of said valve channels and said channel means.

14. In a mold for molding articles from a hardenable molten material, said mold being provided with a cavity plate comprising: a body having a plane meeting face; a sprue passage extending through said body to said face; and a plurality of cavities, open to said face, formed in said body about said sprue passage; the improvement comprising: an annular recess in said face, surrounding said sprue passage and between same and said cavities; a plurality of channel means, each extending radially from said sprue passage across said face to the inner edge of said recess and continuing radially across said face from the outer edge of said recess into communication with said cavities, each one of said cavities being in communication with the outer edge of said recess through only one of said channel means; a valve ring rotatably mounted in said recess; and a plurality of valve channels extending radially, with respect to said sprue passage, across said ring at predetermined spaced intervals such that said ring can be adjustably rotated to place from one to all of said valve channels in communication with from one to all of said channel means, respectively, and thus place said sprue passage in communication with from one to all of said cavities.

15. In a mold for molding articles from a hardenable molten material, said mold being provided with a cavity plate comprising: a body having a plane meeting face; a sprue passage extending through said body to said face; and a plurality of cavities, open to said face, formed in said body about said sprue passage; the improvement comprising: an annular recess in said face surrounding said sprue passage and between same and said cavities; a plurality of first channels, each extending radially from said sprue passage across said face to the inner edge of said recess; a plurality of second channels, each extending across said face from the outer edge of said recess into communication with said cavities, each one of said cavities being in communication with the outer edge of said recess through only one of said second channels; a valve ring rotatably mounted in said recess; and a plurality of valve channels extending radially, with respect to said sprue passage, across said ring at predetermined spaced intervals such that said ring can be adjustable rotated to place from one to all of said valve channels in communication with from one to all of said first channels, respectively, and also in communication with from one to all of said second channels, respectively, and thus place said sprue passage in communication with from one to all of said cavities.

16. In a mold for molding articles from a hardenable molten material, said mold being provided with a cavity plate comprising: a body having a plane meeting face; an opening extending through said body; a sprue bushing disposed in said opening; and a sprue passage extending through said sprue bushing to said face; the improvement comprising: an annular recess in said plane face, surrounding said sprue bushing, and forming an annular land between said bushing and said recess; a plurality of first channels in communication with and extending radially from said sprue passage across the face of said sprue bushing; a plurality of second channels, each one in communication at one end thereof with only one of said first channels, and extending radially, with respect to said sprue passage, across said annular land to the inner edge of said recess; a plurality of cavities formed in said body about the outer edge of said recess and opening to said plane face; a plurality of third channels formed in said plane face and extending radially, with respect to said sprue passage, from the outer edge of said recess into communication with said cavities, each one of said cavities being connected to said recess through only one of said third channels; a valve ring rotatably mounted in said recess; and a plurality of valve channels extending radially, with respect to said sprue passage, across said valve ring at predetermined spaced intervals such that said valve ring can be adjustably rotated to place from one to all of said valve channels in communication with from one to all of said third channels, respectively, and also communication with from one to all of said second channels, respectively, and thus place said sprue passage in communication with from one to all of said cavities.

References Cited in the file of this patent

UNITED STATES PATENTS

| | | |
|---|---|---|
| 2,279,380 | Reid | Apr. 14, 1942 |
| 2,339,443 | Wilson | Jan. 18, 1944 |
| 2,656,569 | Watkins et al. | Oct. 27, 1953 |